United States Patent [19]

Bass, Sr.

[11] Patent Number: 5,896,574
[45] Date of Patent: Apr. 20, 1999

[54] WIRELESS MODEM WITH A SUPPLEMENTAL POWER SOURCE

[75] Inventor: Robert Harrell Bass, Sr., Raleigh, N.C.

[73] Assignee: International Business Machines Corporation, Armonk, N.Y.

[21] Appl. No.: 08/728,011

[22] Filed: Oct. 9, 1996

[51] Int. Cl.[6] .............................. G06F 3/00; H04Q 7/32
[52] U.S. Cl. ...................... 455/557; 364/705.05; 375/222
[58] Field of Search .................................... 455/557, 558, 455/66, 572, 127; 375/220, 222; 395/286; 364/705.05

[56] References Cited

U.S. PATENT DOCUMENTS

| | | | |
|---|---|---|---|
| 3,582,669 | 6/1971 | Dempsey | 307/18 |
| 3,809,916 | 5/1974 | Crane | 307/18 |
| 5,032,819 | 7/1991 | Sakuragi et al. | 340/310.5 |
| 5,313,642 | 5/1994 | Seigel | 395/75 |
| 5,608,607 | 3/1997 | Dittmer | 361/686 |
| 5,628,055 | 5/1997 | Stein | 375/222 |

FOREIGN PATENT DOCUMENTS

| | | | |
|---|---|---|---|
| 9422135 | 9/1994 | WIPO | G11B 5/012 |
| 9621900 | 7/1996 | WIPO | G06F 13/00 |

*Primary Examiner*—Andrew M. Dolinar
*Attorney, Agent, or Firm*—John D. Flynn

[57] ABSTRACT

A wireless modem is provided with a passive power source using a first PCMCIA slot that is normally provided in mobile computer systems. Most mobile computing systems today provide for two or more PCMCIA slots. In the preferred embodiment of the present invention one slot is used by a first PCMCIA adapter that provides for baseband signal processing and power signals to a transceiver device. A second PCMCIA adapter card supplements the power signals provided by the first PCMCIA adapter card to the transceiver. The second PCMCIA adapter card occupies a second PCMCIA slot. The second PCMCIA adapter card supplements the power signals provided by the first PCMCIA card, permitting the transceiver to draw more current than that available from the first PCMCIA card. The transceiver and PCMCIA cards are interconnected by a Y cable in the preferred embodiment and a three connector housing in an alternative embodiment.

23 Claims, 12 Drawing Sheets

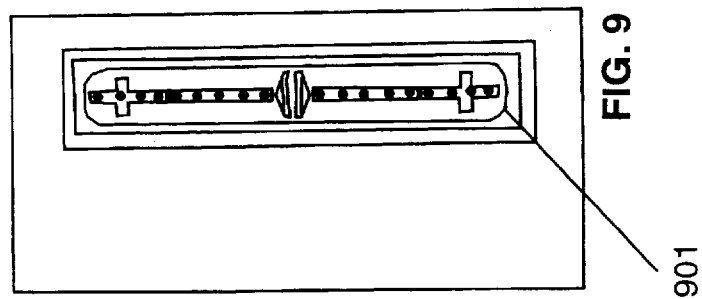
FIG. 9
FIG. 9
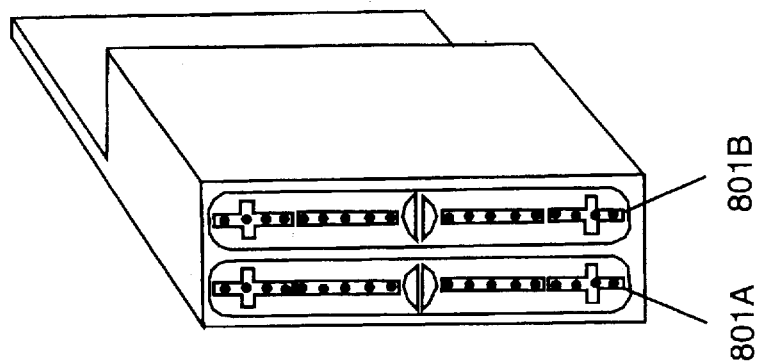
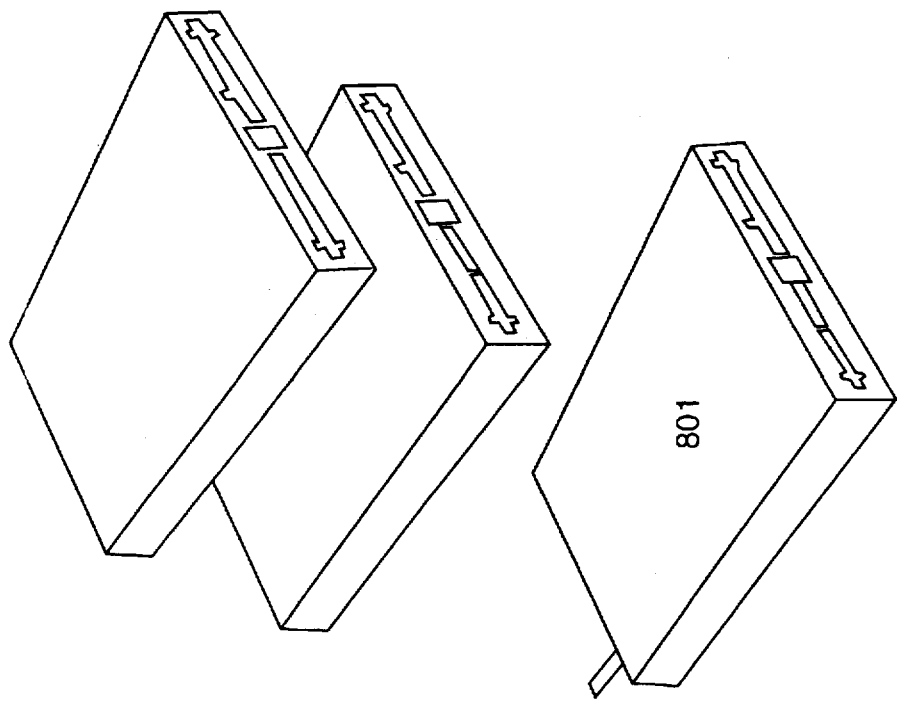
FIG. 8

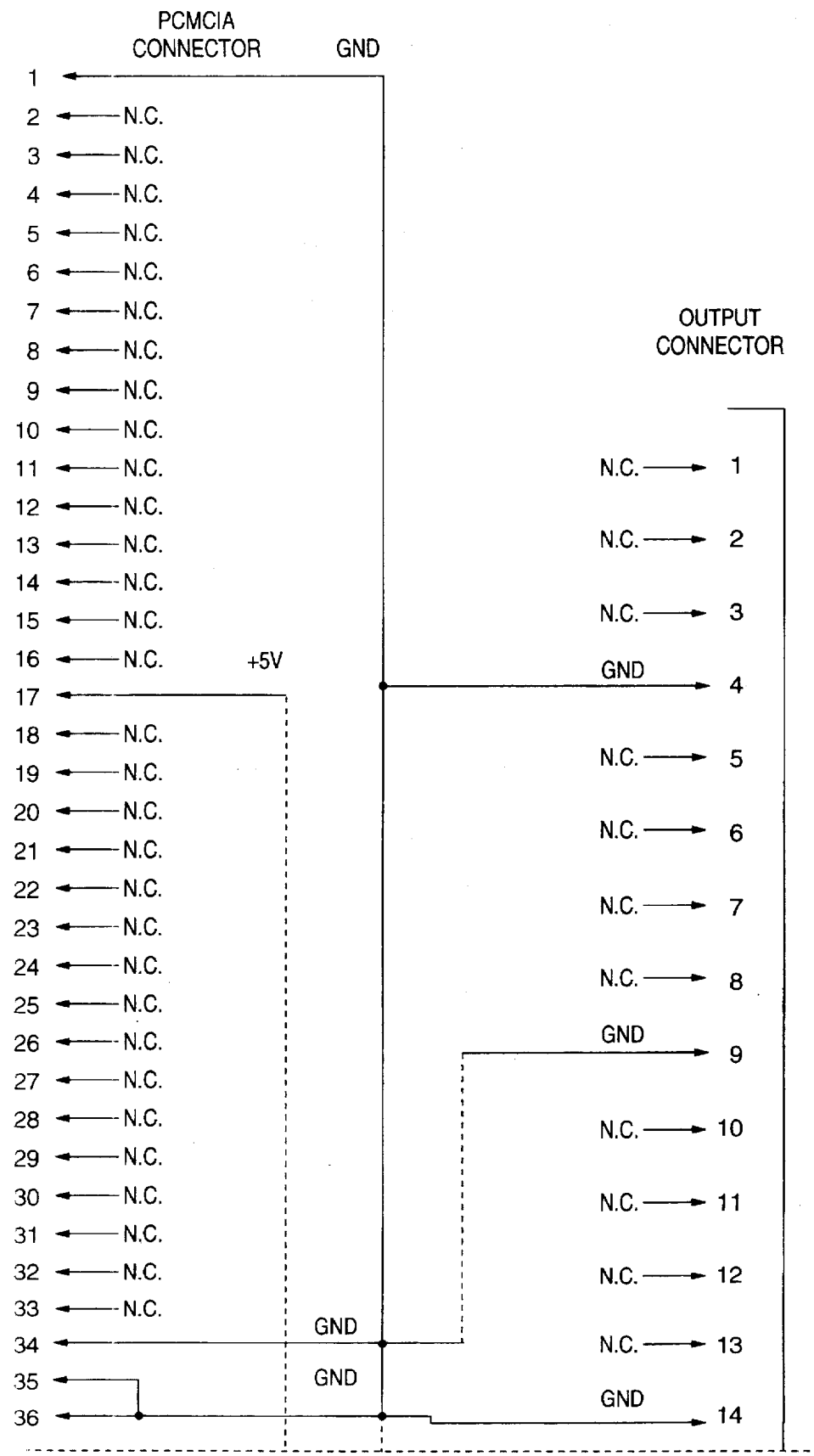

WIRELESS MODEM WITH A SUPPLEMENTAL POWER SOURCE

BACKGROUND OF THE INVENTION

1. Field of the Invention

The present invention relates to a power supply for mobile radio frequency devices. More particularly, it relates to an apparatus for a wireless modem that is implemented utilizing Personal Computer Memory Card International Association (PCMCIA) cards.

2. Description of the Prior Art

Wireless modems enable mobile computer devices to communicate with other computer devices without requiring physical access to a land line communication port. A wireless modem is similar to a wired modem in that it permits a computer or other device to send and receive data from external sources. A wireless modem may be installed as an adapter card or in an adapter slot such as a PCMCIA slot. A wireless modem typically consists of two major portions: a radio portion and a baseband portion.

The radio portion consists of a transmitter and a receiver. The transmitter and receiver may share a common antenna via a duplexer. The transmitter is responsible for generating RF signals using a baseband signal to modulate a carrier signal. The receiver is responsible for producing a baseband signal from RF signals by demodulating an RF signal received at the antenna to produce a demodulated baseband signal. The radio provides physical access to a network or connection (i.e., the wireless network). An antenna is used for transmitting and receiving the electromagnetic communications signals from the air interface.

The baseband portion provides a baseband signal to the transmitter and accepts baseband signals from the radio portion receiver. The baseband portion decodes the baseband signals to provide data (i.e., receiving data) and encodes data to provide a baseband signal for transmission by the transmitter (i.e., sending data).

As is typical of wireless modems, the baseband portion fits into a PCMCIA adapter slot. The baseband PCMCIA adapter is attached via a flat cable to its radio portion. The radio portion contains the transmitter, receiver and associated circuitry to provide for RF communications. The ability of the radio to transmit at certain ranges is limited by the transmit power it can radiate via the antenna. The radio can require substantial amounts of current (as much as 1 amp) to operate. Most wireless system require that the transmitter radiate power at levels up to 3 watts. The transmitted power levels in some wireless systems are controlled by the base station transmitter. The radiated power level can thus require that approximately 1 amp of current be supplied to the radio portion of the wireless modem when the wireless modem is radiating at full power or higher power levels. Typically transmit power levels for Advanced Mobile Phone Service (AMPS) cellular and Cellular Digital Packet Data (CDPD) transmissions are 600 mW. For Advanced Radio Data Information Service (ARDIS), transmission levels of 1 W are typical.

The baseband portion or PCMCIA card can typically only supply the radio portion with a ½ amp (500 mnA) of current. This limitation is due to the nature of the PCMCIA interface and the PCMCIA standard itself. Current PCMCIA slots are not configured to provide for more than a ½ amp (500 mA) of current. The PCMCIA standard provides for low power memory and I/O Cards. Some I/O cards (i.e., Ethernet, Token ring, modem etc) use more power than the typical PCMCIA power control circuits can deliver. Thus, the baseband portion PCMCIA card can only supply less than half the required current when the radio transmitter is operating at higher power levels. In order to provide the required power, prior art systems have supplemented the power supplied to the radio with an external tethered battery pack.

However, the tethered battery creates several problems, especially for laptops or mobile computing devices. The external battery is inconvenient for mobile computer users to carry (i.e., 4 AA NiCAD batteries). This inconvenience is caused by the bulk and weight of the external battery. Also the external battery needs to be charged and recharged which can require a separate charger that further adds to the equipment a mobile user must carry. The external battery also makes the mobile device unwieldy to place and utilize. The space occupied by the battery gives the wireless modem a "glob like" appearance that does not suit the aesthetically appealing sleek look of mobile computing devices.

These unresolved problems and deficiencies are clearly felt in the art and are solved by the invention in the manner described below.

SUMMARY OF THE INVENTION

The above-mentioned needs have been met in accordance with the present invention by providing for an apparatus that satisfies these needs. Accordingly, it is an object of the present invention to provide a wireless modem that operates at a range of transmit power levels without the need for an external battery.

It is an object of the invention to provide additional power to a wireless modem by making use of a second PCMCIA card to provide additional power.

It is an object of the invention to provide all power requirements for the wireless modem from a host computer device.

It is an object of the present invention to provide a wireless modem that does not require a separate battery charger.

It is another object of the invention to provide a lightweight wireless modem.

It is a further object of the invention to provide a wireless modem that has a sleek slimline appearance.

It is yet another object of the invention to provide a wireless modem that is very portable.

Accordingly, the present invention provides a mobile computer having a first PCMCIA adapter slot; a second PCMCIA slot; a first PCMCIA adapter having a PCMCIA connector, PCMCIA interface logic, a second connector providing a transceiver interface, the transceiver interface including outputting power signals from the PCMCIA connector, the first PCMCIA adapter providing for baseband signal processing; a second PCMCIA adapter having a PCMCIA connector, an output power connector and PCMCIA interface logic, wherein the PCMCIA interface logic provides power to the output power connector; a transceiver for transmitting and receiving signals; and a Y cable having three ends, a first end for connecting to the first PCMCIA adapter via the transceiver connector, a second end for connecting to the second PCMCIA adapter via the output power connector, and third end for connecting to the transceiver, the Y cable coupling transceiver interface signals between the first PCMCIA adapter and the transceiver and coupling power signals from the second PCMCIA adapter to the transceiver. In an alternative embodiment the

3

Y cable may be replaced with housing that provides for the electrical coupling of the connectors such that when the PCMCIA adapters and the transceiver are inserted into the respective connectors, the transceiver interface signals, including power signals, are electrically coupled between the first PCMCIA adapter and the transceiver and the power signals from the second PCMCIA adapter are electrical coupled to the transceiver.

BRIEF DESCRIPTION OF THE DRAWINGS

The foregoing and other objects, aspects and advantages of the invention will be better understood from the following detailed description with reference to the drawings, in which:

FIG. 8 depicts a view of the housing adapter showing the stacked PCMCIA connectors.

FIG. 9 depicts a view of the housing adapter showing the radio portion connector FIG. 10. depicts a detailed view of the baseband to radio module interface.

FIGS. 11, 11A and 11B depict the passive PCMCIA card with signaling between the PCMCIA connector and the output power connector.

FIGS. 12, 12A and 12B depict the signal mapping between the baseband PCMCIA card, the passive PCMCIA card and the radio module.

DETAILED DESCRIPTION

Figure 1:
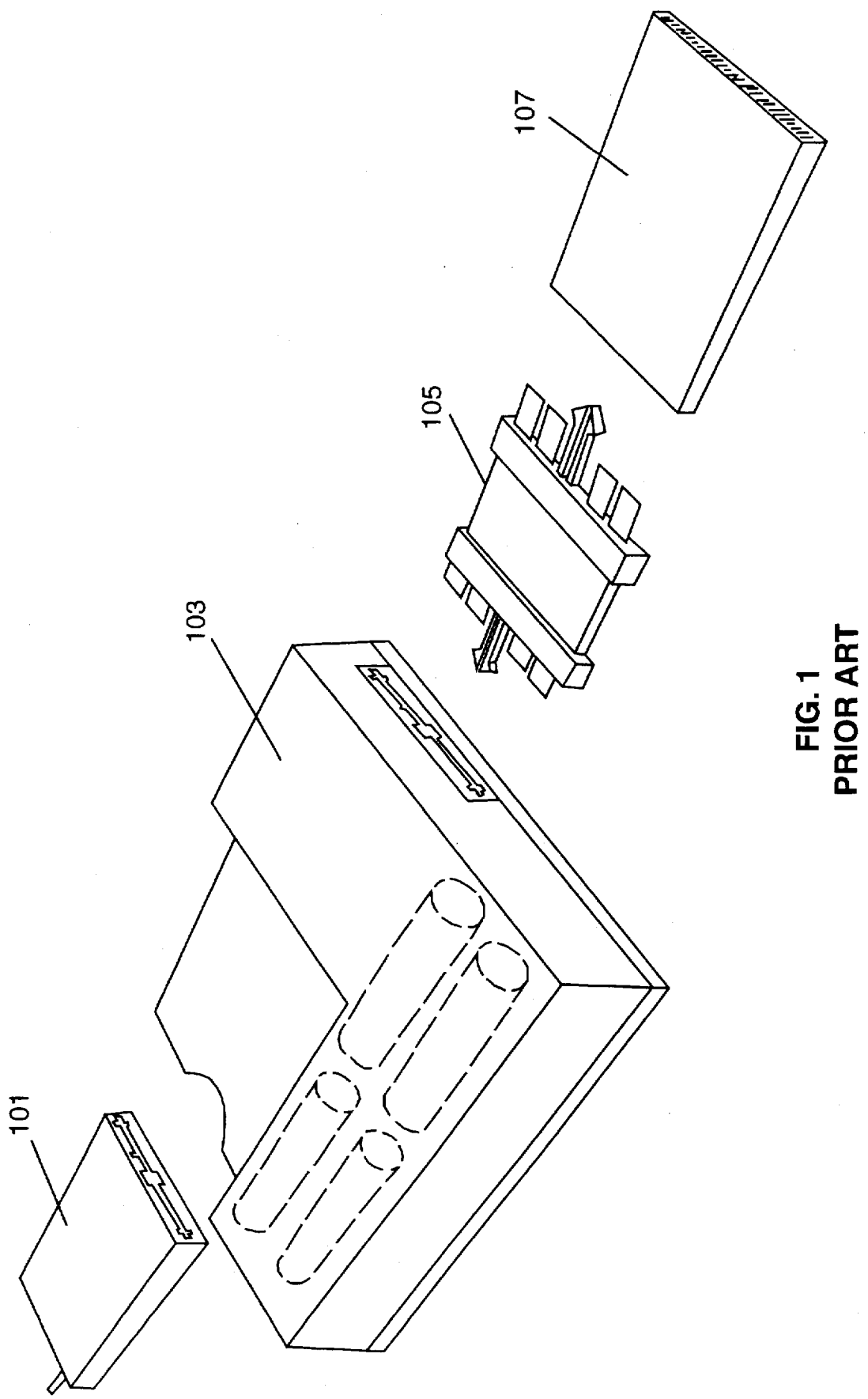
FIG. 1 is an overview of a wireless modem using an external battery.
Figure 10:
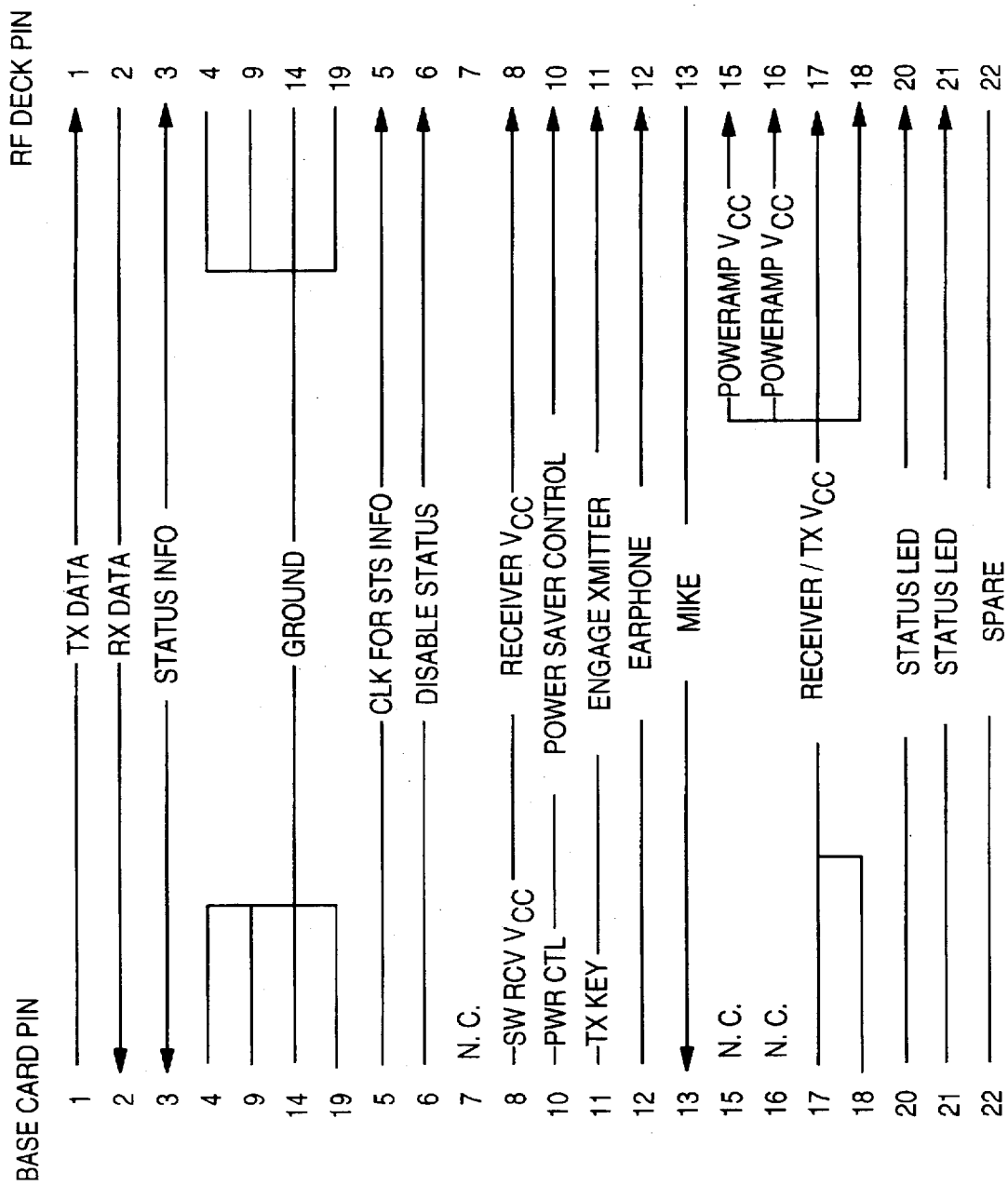

A typical wireless modem is depicted in FIG. 1. A PCMCIA card 107 contains a baseband portion of the modem. The PCMCIA card 107 contains a 68 pin PCMCIA standard connector that enables the card to be inserted into any PCMCIA adapter slot. The baseband card is connected to the radio module 101 by a cable 105 or other suitable connector. The cable 105 carries signals between the radio module 101 and the baseband card 107. These signals provide the radio module 101 with power, control information, baseband signals for transmission and provides the baseband portion with status information and received baseband signals. FIG. 10 provides a detailed view of the interface between the radio module 101 and the baseband card 107. FIG. 10 shows that power is supplied via the voltage $V_{CC}$ to the radio side via a number of lines along with a number of grounds (lines 4, 9, 14, and 19). $V_{CC}$ lines are shown as Sw Rcv Vcc Line 8 and from line 17 and 18 on the baseband card to lines 15–18 on the radio portion. Note that the lines for 15 and 16 on the radio module supply voltage to the power amplifier associated with the RF transmitter. Note also the large bulky battery housing 103 in FIG. 1. The battery housing 103 is capable of containing 4 re-chargeable AA batteries. The battery housing 103 also provides a mating interface for the radio module to connect to the baseband card via a connector or cabling interface.

4

The radio module is supplied power from the batteries and from the baseband PCMCIA card 107.

Figure 2:
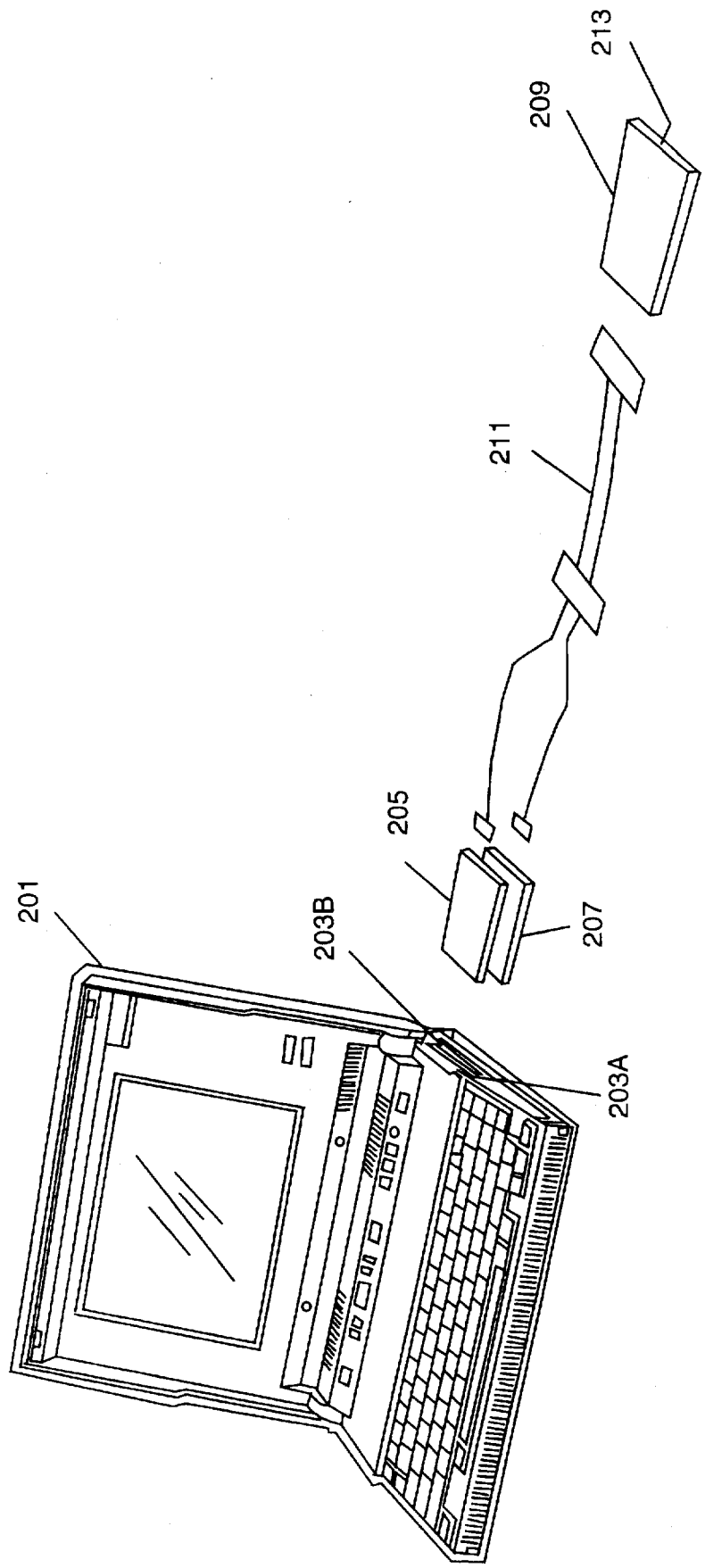
FIG. 2 depicts a host device and a wireless modem having a Y cable.

An embodiment of the present invention is shown in FIG. 2. A host device 201, such as an IBM Thinkpad computer, having stacked PCMCIA slots (203A, 203B), is shown. For the purposes of this specification, "Mobile Computer" is a generic term used to describe a machine, which is usually a computer or terminal or lap top or palm top or hand held or personal digital assistant or other computer. In the preferred embodiment the mobile computer provides slots for accepting adapter cards that meet applicable Personal Computer Memory Card International Association (PCMCIA) standards. As shown the wireless modem consists of a first PCMCIA adapter card 205 containing the baseband portion of the modem and a second PCMCIA adapter card 207 for providing additional power to the radio module 209. A Y cable 211 is shown for connecting each of the PCMCIA cards to the radio module 209. The radio module 209 is shown with antenna 213. Note that the radio module can be mounted on the host device 201 such as the back of the display or integrated into the host device 201. The radio module 209 is supplied power from both PCMCIA cards via the Y cable. In an alternative embodiment the baseband adapter card and radio module can be integrated into a single card that can be inserted into a PCMCIA slot. A connector can be added to the single integrated card so that the passive power card can provide power to the integrated card. The single integrated card may have a section that protrudes externally from the PCMCIA slot when the integrated card is inserted into the slot.

Figure 3:
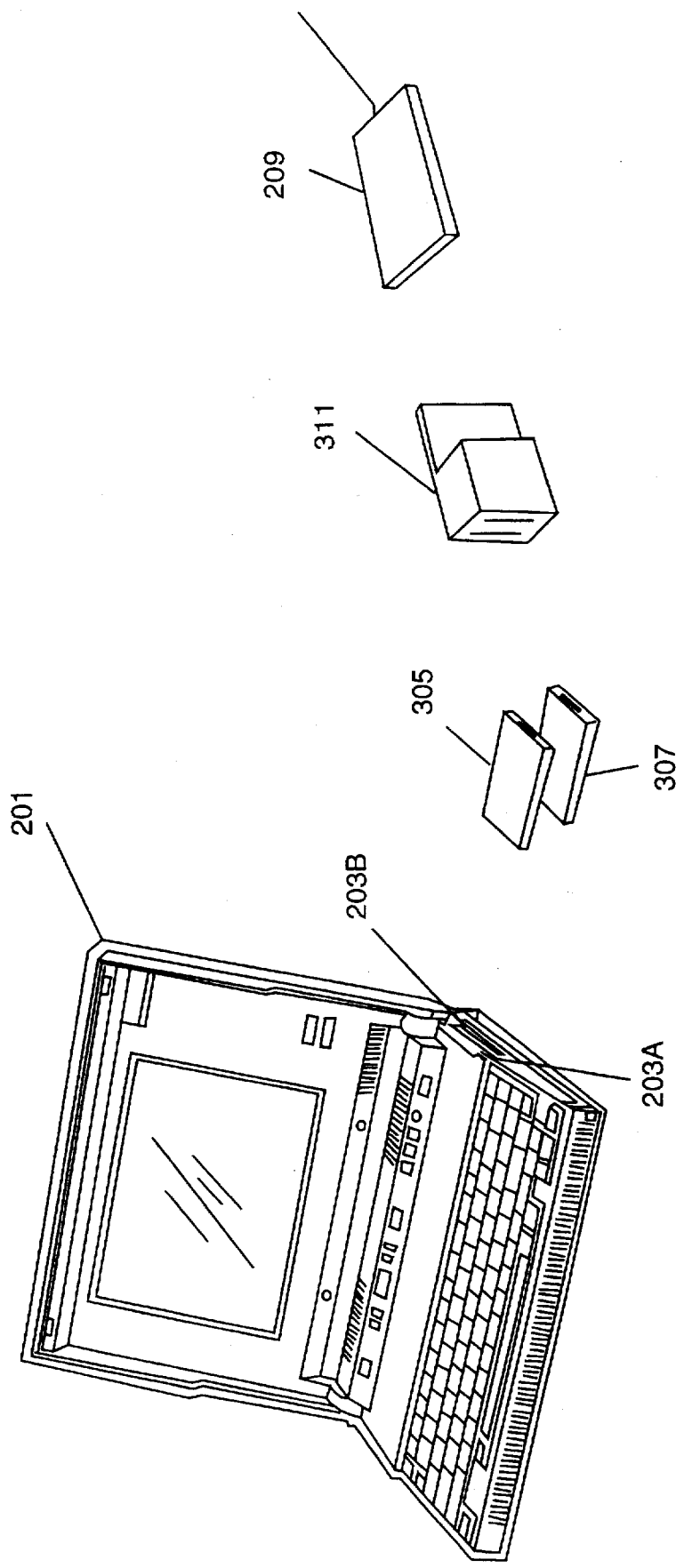
FIG. 3 depicts a host device and a wireless modem having a housing adapter.

FIG. 3 depicts an alternative embodiment that eliminates the need for the Y cable 211. In the alternative embodiment the radio module 209 can be contained in a housing container 311 that permits each of the PCMCIA cards to be directly connected to the housing. The housing container 311 then provides the circuitry for combining the signals if needed along with connectors for physically and electrically coupling the PCMCIA cards and radio module to the housing. The housing 311 is particularly useful when the host device 201 provides for stacked PCMCIA slots (203A, 203B) as shown in FIG. 2 and FIG. 3. The embodiment in FIG. 3 with the housing eliminates the need for the mobile user to carry the Y cable. The housing 3 11 can also be designed so that it is only slightly larger then the radio module 209. Thus, housing 311 in addition to providing the three connectors can also provide a sheath for the radio module. This is shown in FIGS. 8 and 9. The housing can be made of plastic or any other suitable material.

Figure 4:
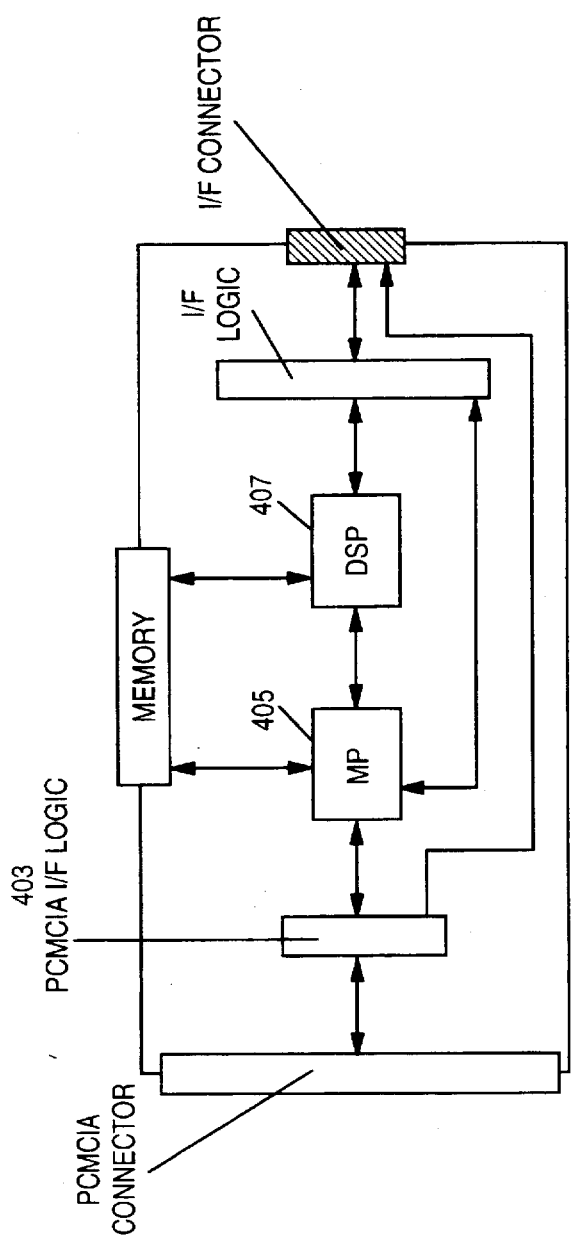
FIG. 4 depicts the baseband portion of a wireless modem.

The PCMCIA interface is described in detail in the PCMCIA Specification (i.e., Personal Computer Memory Card International Association—PCMCIA Standard Release 2.1) which is hereby incorporated by reference. The PCMCIA standard provides for data storage ("Memory") and peripheral expansion ("I/O") card types. The PCMCIA standard provides an I/O capability which provides a standard for bus expansion slot so that peripherals like modems and LAN adapters can make use of the bus. FIG. 4 depicts a functional overview of the baseband PCMCIA adapter card wireless modem. The adapter card contains a PCMCIA Connector 401 (i.e., 68 Pin connector) and PCMCIA interface logic 403 for providing the wireless modem with an external interface to a host device. The PCMCIA interface logic 403 may be combined with microcontroller 405 which may also be combined with DSP 407. The baseband PCMCIA adapter card looks to the PCMCIA bus as an I/O card type.

Figure 5:
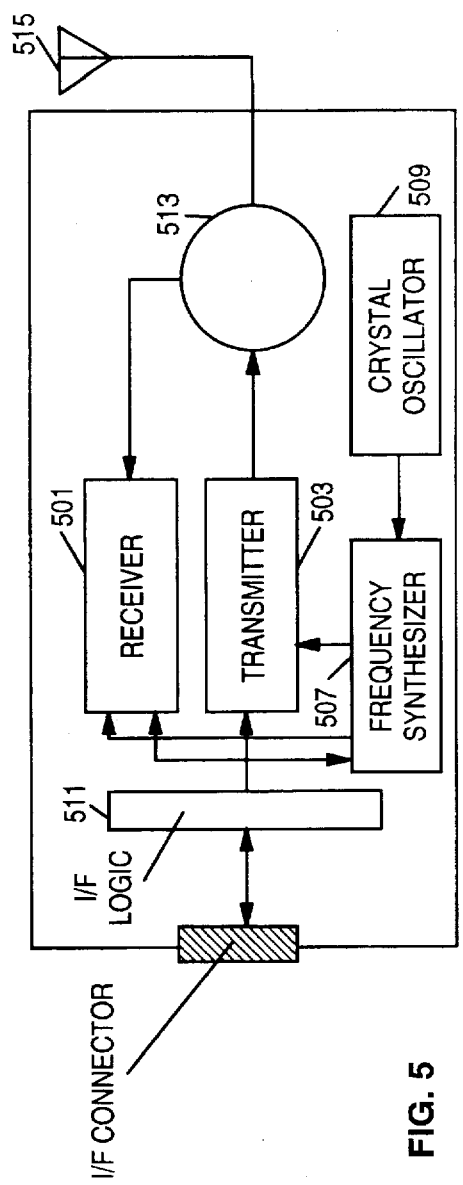
FIG. 5 depicts the radio portion of a wireless modem.

FIG. 5 depicts a functional overview of the radio module of a wireless modem. In the preferred embodiment the radio module consists of a transmitter 503 for modulating signals and a receiver 501 for demodulating signals. The transmitter 503 and receiver 501 may share a common antenna 515 via a duplexer 513. The transmitter 503 is responsible for generating an RF signal at a carrier frequency using a baseband signal and a carrier frequency (i.e., modulating the carrier frequency in accordance with the baseband signal). The receiver 501 is responsible for producing a baseband signal from an RF signal using a local oscillator signal (i.e., demodulating the RF signal to provide the baseband signal). The radio module provides physical access to a network or connection (i.e., the wireless network). An antenna 515 is used for transmitting and receiving the electromagnetic communications signals from the air interface. Note that in both the Receiver and Transmitter a local oscillator signal at a designated frequency is shown. However a single crystal may be utilized to produce the local oscillator signal for multiple frequencies and channels. As shown in FIG. 5 a programmable frequency synthesizer 507 may also be utilized in the modem for providing a plurality of frequencies so that multiple channels and full duplex operation are supported. The modem may also provide support for a plurality of protocols. The radio module may also provide for spread spectrum or frequency hopping. Also note that although the present invention is depicted with only a single receive/transmit stage, multiple stages can be used, as is common for instance in superheterodyne receivers. Thus, IF stages and filters and amplifiers are not shown or discussed. All or any subset of the above functions can be provided in a single semiconductor device.

Figure 6:
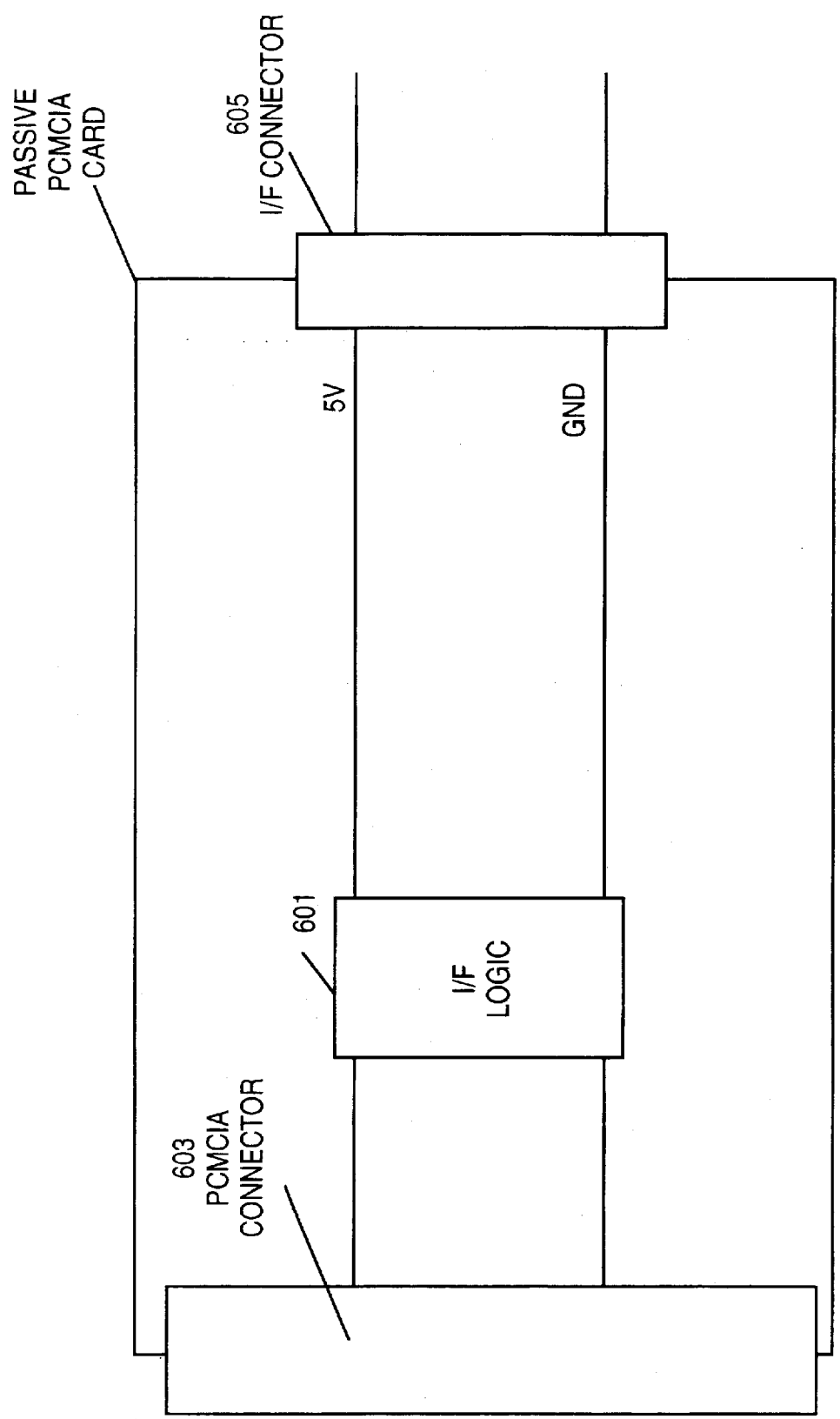
FIG. 6 depicts the passive PCMCIA card for supplying power to the radio portion.
Figures 11A, 11B:
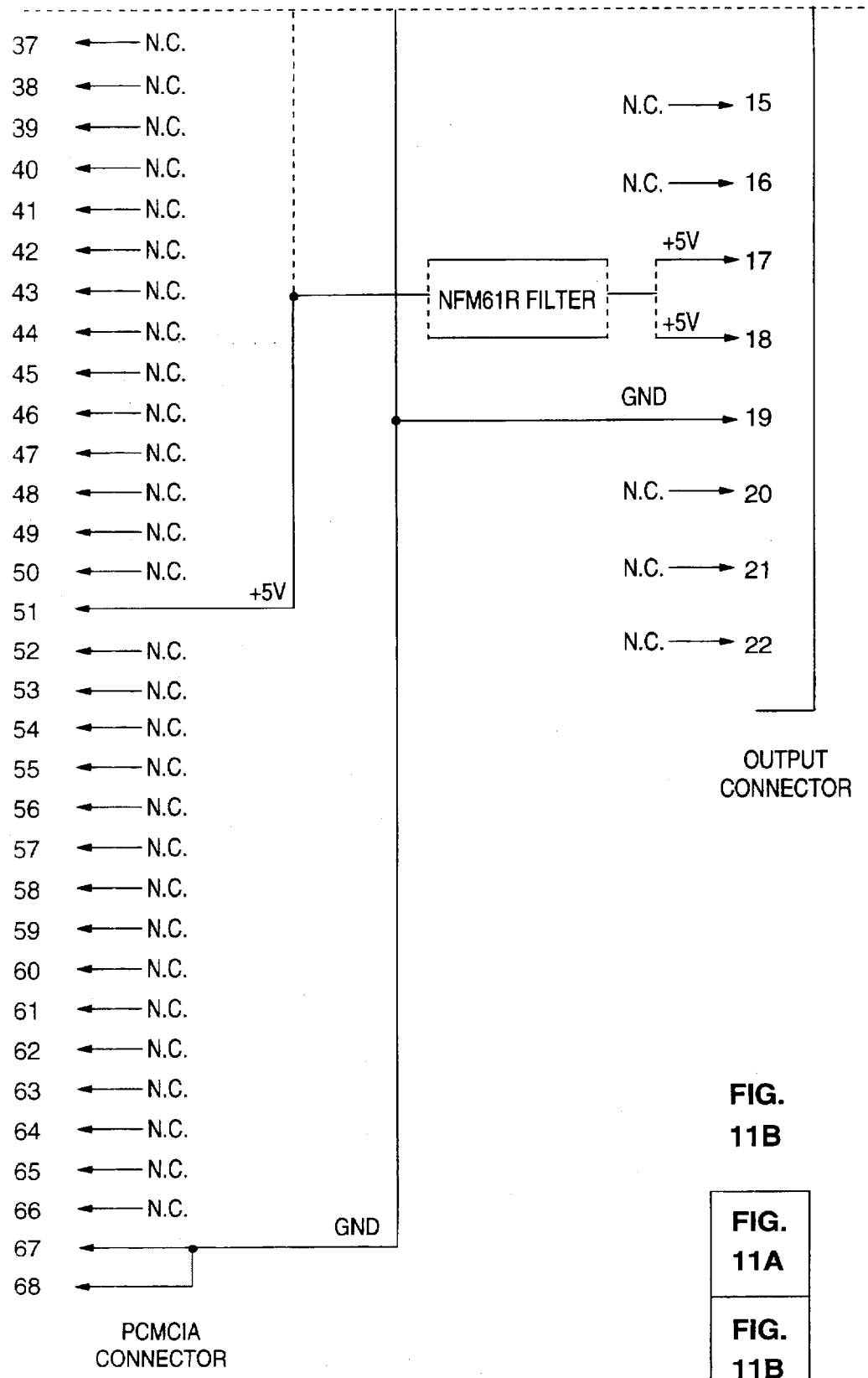

FIG. 6 depicts the passive PCMCIA adapter card of the wireless modem. The PCMCIA interface logic 601 and PCMCIA connector 603 conform to the PCMCIA Standard. The adapter card is wired such that it looks to the PCMCIA bus as a memory card. This is shown in FIG. 11. This is accomplished by grounding both Ground line 36 and Card Detect line 67. The PCMCIA bus thus supplies power to the passive PCMCIA adapter card determining that it is a memory card. The passive PCMCIA adapter card then supplies power to the wireless modem. Note that certain PCMCIA signals are brought to output power connector 605 that supplies power to the radio module of the modem. The signal mapping between these two connectors is shown in FIG. 11 using a 22 pin ITT connector as the output connector and the 68 Pin PCMCIA connector 603. The 22 pin ITT connector is used also on the baseband PCMCIA adapter card and radio module. A filter is connected to the voltage source for lines 16 and 17. In the preferred embodiment this filter provides EMC noise filtering. Thus, noise is removed from the power supplied by the passive PCMCIA card. Although the present invention has been described using a 22 pin connector other connectors with different line signaling may be used as well. Also the signals could also be mapped differently. For instance, +5 v signals on the passive PCMCIA adapter card could be supplied to pins 15 and 16 on the 22 pin connector instead of pins 17 and 18 as shown.

Figure 7:
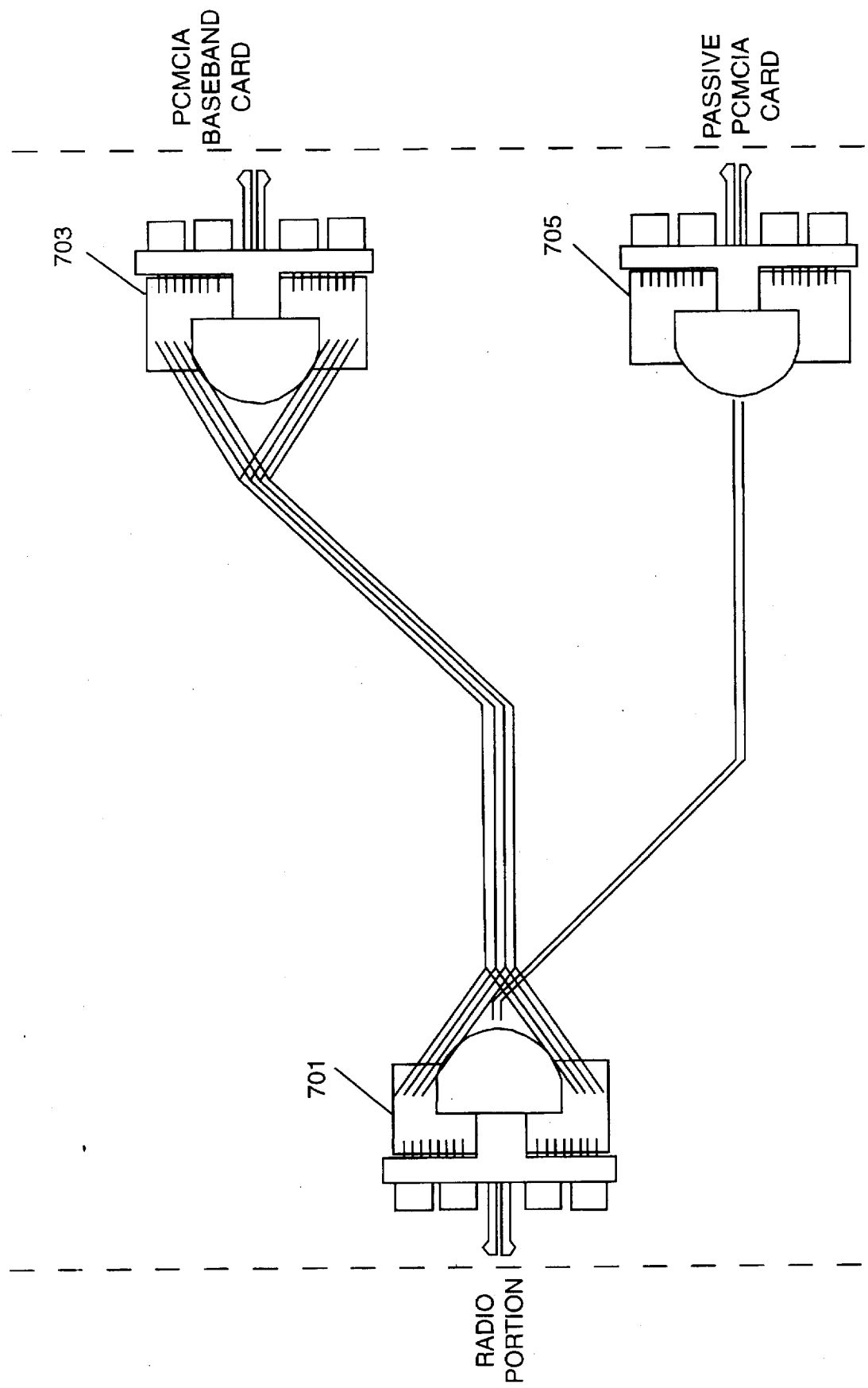
FIG. 7 depicts a Y cable.
Figure 12A:
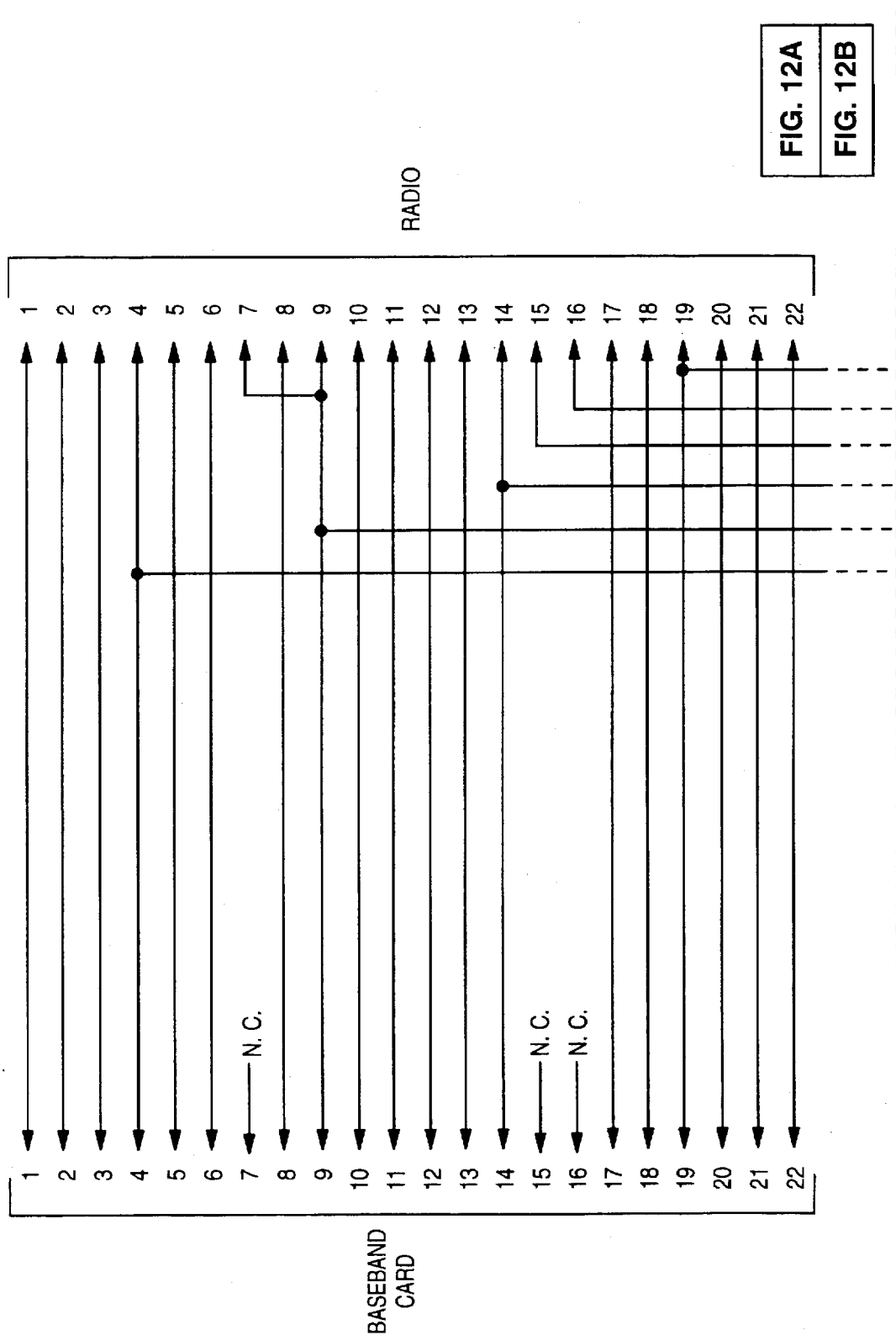
Figure 12B:
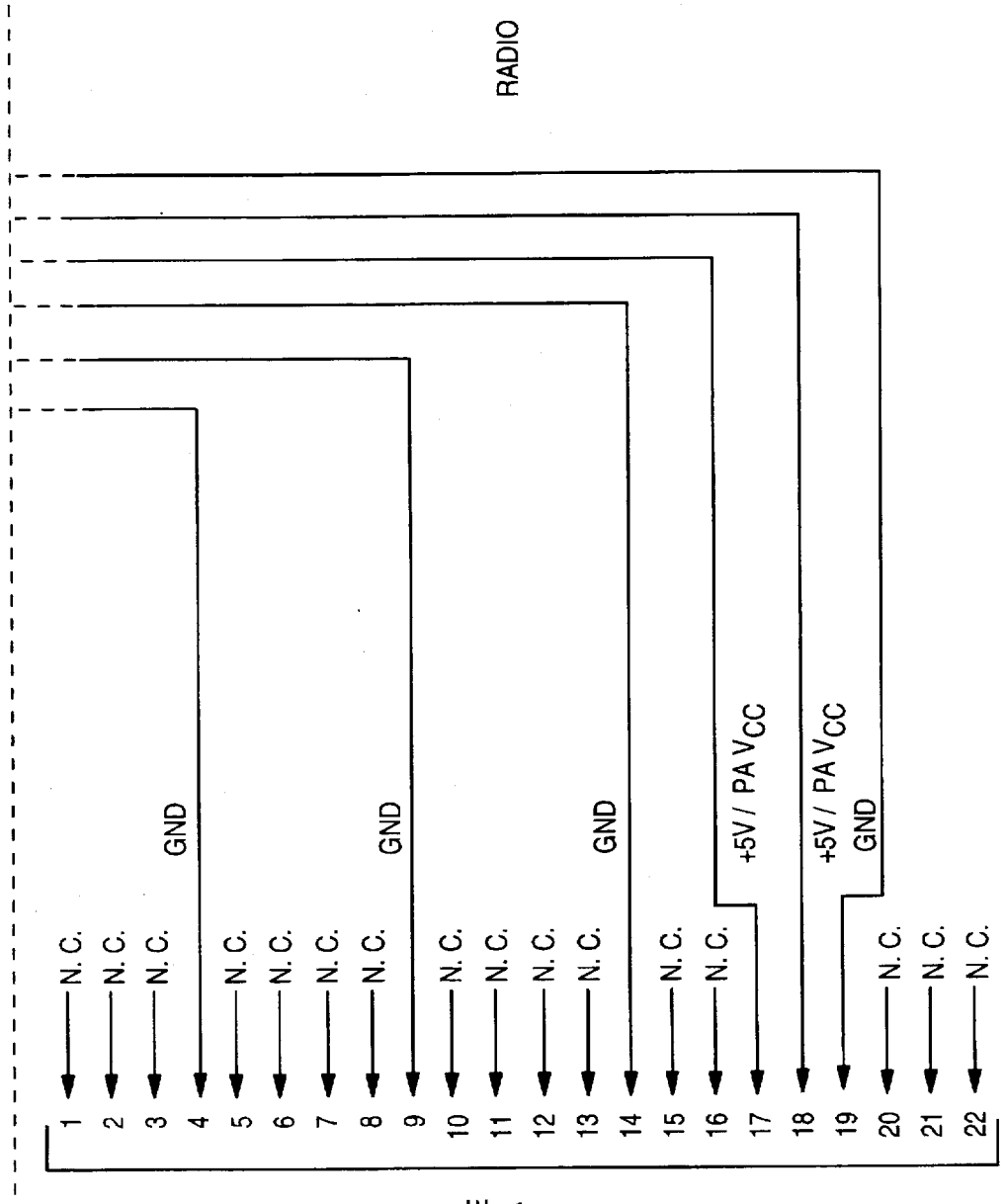

The radio module may have separate connectors for receiving the signals from the baseband PCMCIA adapter card and the passive PCMCIA card. This can be achieved using separate cables for each PCMCIA card. A Y cable may be used to combine the signals obtained from each of the PCMCIA cards and for providing the signals into a single connector which attaches to the radio module. An embodiment of the Y cable shown in FIG. 7. Each of the Y cable connectors can be polarized to prevent insertion into other then the correct card (i.e., radio, passive power, baseband). The connectors on each of the cards would have a corresponding polarization. The polarization could take the form of appropriately placed notches with corresponding slots. One embodiment of the signaling that can be used in the Y Cable is shown in FIG. 12. This figure shows the signal mapping from the baseband PCMCIA adapter card shown in FIG. 10 and from the passive PCMCIA adapter card shown in FIG. 11. The special housing or Y cable can easily accommodate the signal mapping as shown in FIG. 12.

A special housing may also be utilized to provide the power and other signals to the radio module of the wireless modem adapter card as shown in FIG. 8. This figure depicts the radio module with the baseband PCMCIA adapter card and the passive PCMCIA adapter card. In the preferred embodiment each of the cards (Radio, PCMCIA Cards) is shown having a female connector as the interface to a male connector of the housing adapter. The housing adapter thus has three male connectors i.e., two as shown in FIG. 8, 801A and 801B, and one connector 901 as shown within a container for holding the radio module in FIG. 9. In the preferred embodiment these connectors are the ITT 22 pin connectors previously discussed. However, it should be noted that any type of connector can be used to mate each of the housing connectors to each of the cards in any male/female combination. The connectors on the housing and the radio, baseband, and passive power cards that are used for insertion into the housing may be polarized so as to prevent insertion into other then the correct connector and in the correct orientation. The connectors in FIG. 8 and FIG. 9 are not shown with any special polarization.

Any PCMCIA slot may be used by any PCMCIA adapter card in the host device. The PCMCIA cards may be attached to the housing then inserted into a host device supporting a stacked PCMCIA slot configuration. The PCMCIA Cards may first be inserted into the stacked slots and then connected. Most mobile computers are equipped with stacked PCMCIA slots. However, a housing can also be provided for side by side PCMCIA slots. The connectors on such an alternative housing would also be side by side. The three connectors on the housing are electrically coupled as shown in FIG. 12.

Note that although the present invention has been described with respect to a radio module, the invention can also be used with an IR transceiver and also with an RF transceiver in a cellular phone. In the case of the cellular phone the Y-cable connector terminating at the phone and the signal mapping would depend on the particular type of cellular phone that was utilized.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. A wireless modem adapted for use in a computer, the wireless modem comprising:
    a transceiver for transmitting and receiving signals;
    a first PCMCIA adapter having a PCMCIA connector, PCMCIA interface logic, a second connector providing a transceiver interface, the transceiver interface including outputting power signals from said PCMCIA connector, said first PCMCIA adapter providing for baseband signal processing;
    a second PCMCIA adapter having a PCMCIA connector, an output power connector and PCMCIA interface logic, wherein the PCMCIA interface logic provides power to the output power connector; and a Y cable having three ends, a first end for connecting to the first PCMCIA adapter via the transceiver interface connector, a second end for connecting to the second PCMCIA adapter via the output power connector, and a third end for connecting to the transceiver, the Y cable coupling transceiver interface signals, including power signals, between the first PCMCIA adapter and the transceiver and coupling power signals from the second PCMCIA adapter to the transceiver.

2. The wireless modem of claim 1 wherein the transceiver transmits and receives RF signals.

3. The wireless modem of claim 2 wherein the transceiver is a radio module.

4. The wireless modem of claim 2 wherein the transceiver is a cellular phone.

5. The wireless modem of claim I wherein the second PCMCIA adapter includes a power filter for reducing EMC noise in the power supplied to the transceiver.

6. A wireless modem adapted for use in a computer, the wireless modem comprising:

a transceiver for transmitting and receiving signals;

a first PCMCIA adapter having a PCMCIA connector, PCMCIA interface logic, a second connector providing a transceiver interface, the transceiver interface outputting power signals from said PCMCIA connector, said first PCMCIA adapter providing for baseband signal processing;

a second PCMCIA adapter having a PCMCIA connector, an output power connector and PCMCIA interface logic, wherein the PCMCIA interface logic provides power to the output power connector; and a housing having three connectors, a first connector for coupling the first PCMCIA adapter via the transceiver interface connector, a second connector for coupling to the second PCMCIA adapter via the output power connector, and a third connector for coupling to the transceiver, the housing providing electrical coupling of the connectors such that when the PCMCIA adapters and the transceiver are inserted into the respective connectors, the transceiver interface signals are electrically coupled between the first PCMCIA adapter and the transceiver and the power signals from the second PCMCIA adapter are electrically coupled to the transceiver.

7. The wireless modem of claim 6 wherein the transceiver transmits and receives RF signals.

8. The wireless modem of claim 7 wherein the transceiver is a radio module.

9. The wireless modem of claim 6 wherein the transceiver is a cellular phone.

10. The wireless modem of claim 6 wherein the second PCMCIA adapter includes a power filter for reducing EMC noise in the power supplied to the transceiver.

11. A PCMCIA adapter card for supplying power to an external device said PCMCIA adapter card comprising:

a PCMCIA connector;

an external power connector for supplying power to an external device; and a PCMCIA interface logic providing for a memory type card interface, said PCMCIA interface logic including power lines coupling the PCMCIA connector to the external power connector for supplying power to the external power connector from the PCMCIA connector when the PCMCIA connector is coupled to a PCMCIA bus.

12. A PCMCIA adapter card for supplying power to an external device said PCMCIA adapter card comprising:

a PCMCIA connector;

an external power connector for supplying power to an external device;

a PCMCIA interface logic providing for a memory type card interface, said PCMCIA interface logic including power lines coupling the PCMCIA connector to the external power connector for supplying power to the external power connector from the PCMCIA connector when the PCMCIA connector is coupled to a PCMCIA bus; and a power filter for reducing EMC noise in the power supplied to the external power connector.

13. A mobile computer comprising:

a transceiver for transmitting and receiving signals;

a first PCMCIA adapter slot;

a second PCMCIA adapter slot;

a first PCMCIA adapter having a PCMCIA connector, PCMCIA interface logic, a second connector providing a transceiver interface, the transceiver interface outputting power signals from said PCMCIA connector, said first PCMCIA adapter providing for baseband signal processing;

a second PCMCIA adapter having a PCMCIA connector, an output power connector and PCMCIA interface logic, wherein the PCMCIA interface logic provides power to the output power connector; and a Y cable having three ends, a first end for connecting to the first PCMCIA adapter via the transceiver interface connector, a second end for connecting to the second PCMCIA adapter via the output power connector, and third end for connecting to the transceiver, the Y cable coupling transceiver interface signals between the first PCMCIA adapter and the transceiver and coupling power signals from the second PCMCIA adapter to the transceiver.

14. The mobile computer of claim 13 wherein the transmits and receives RF signals.

15. The mobile computer of claim 13 wherein the transceiver is a radio module.

16. The mobile computer of claim 13 wherein the transceiver is a cellular phone.

17. The mobile computer of claim 13 wherein the second PCMCIA adapter includes a power filter for reducing EMC noise in the power supplied to the transceiver.

18. A mobile computer comprising:

a first PCMCIA adapter slot;

a second PCMCIA adapter slot;

a first PCMCIA adapter having a PCMCIA connector, PCMCIA interface logic, a second connector providing a transceiver interface, the transceiver interface including outputting power signals from said PCMCIA connector, said first PCMCIA adapter providing for baseband signal processing;

a second PCMCIA adapter having a PCMCIA connector, an output power connector and PCMCIA interface logic, wherein the PCMCIA interface logic provides power to the output power connector;

and a transceiver for transmitting and receiving signals;

a housing interface having three connectors, a first connector for coupling to the first PCMCIA adapter via the transceiver connector, a second connector for coupling to the second PCMCIA adapter via the output power connector, and a third connector for coupling to the transceiver, the housing providing for the electrical coupling of the connectors such that when the PCMCIA adapters and the transceiver are inserted into the respective connectors, the transceiver interface signals are electrically coupled between the first PCMCIA adapter and the transceiver and the power signals from the second PCMCIA adapter are electrically coupled to the transceiver.

19. The mobile computer of claim 18 wherein transceiver transmits and receives RF signals.

20. The mobile computer of claim 18 wherein the transceiver is a radio module.

21. The mobile computer of claim 18 wherein the transceiver is a cellular phone.

22. The mobile computer of claim 18 wherein the second PCMCIA adapter includes a power filter reducing EMC noise in the power supplied to the transceiver.

23. The mobile computer of claim 18 wherein the first and second PCMCIA adapter slots are stacked and where the first and second connectors on the housing are in a stacked configuration.

* * * * *